Patented Mar. 2, 1948

2,437,082

UNITED STATES PATENT OFFICE 2,437,082

WASH RESISTANT FILTER MEDIA

Herbert Leroy Davis, Highland Park, N. J., and Laurence R. B. Hervey, West Concord, Mass., assignors to Johnson & Johnson, a corporation of New Jersey No Drawing. Original application April 18, 1942, Serial No. 439,550. Divided and this application July 11, 1944, Serial No. 544,473

2 Claims. (Cl. 210—203)

This invention relates to filter media and more particularly to fibrous filter discs such as cotton fiber discs treated in such a way as to bond the surface fibers together to resist the deleterious effects, known as washing, resulting from impact, whirling, eddying, flow, and other actions present when milk or other fluids are poured upon the discs.

This application is a division of our copending application Serial No. 439,550, filed April 18, 1942.

It has been the practice in some sections and is becoming more common to filter milk as close to the source as possible, that is, at the farm as soon as it is drawn from the cow. For this type of filtering it is customary to use what may be termed single-use filter discs, because of their effectiveness and economy. Such discs are usually made of cotton webs and are held in suitable metal strainer bodies which rest upon cans for reception of the filtered milk. This immediate filtration of milk is designed primarily to remove the coarser dirt and debris together with as much of the fine dirt and particles as can be caught on the filter discs. These filter discs are usually made of webs of carded cotton and may be unfaced or faced upon one or both sides with gauze or heavier materials for added strength depending upon the type of strainer in which they are used.

In actual use the metal strainer with its filter disc fastened therein is placed upon the top of a milk can and the milk from pails or other containers is dumped into the strainer and allowed to filter through the disc into the lower can. In actual use the milk is dumped into the strainer and in spite of the baffles generally used and/or the gauze reinforcing facings, this dumping of the milk has a tendency to cause a "washing" or displacement of the cotton fibers due to the impact, whirling, eddying, or flow of the milk across and through the disc with the resultant production of thin spots or actual holes or channels in the discs through which dirt passes, which dirt should be filtered out.

It is an object of this invention to provide an improved filter disc which is resistant to this washing action, whereby the finished discs are wash resistant, i. e., are not affected as to their efficient filtration and are in fact more efficient because of uniform filtering action throughout their normal life.

Prior attempts have been made to produce such filter discs by sizing and/or starching the disc to retain the fibers in position and impart desired "handling" characteristics to the disc and thus overcome the ineffectiveness of the baffles and like devices heretofore mentioned, and to eliminate the necessity of gauze facings. Such sizings, however, have proved ineffective for various reasons, the principal one being that such sizings do not impart sufficient wash resistance to the filter disc unless used in such quantities as to reduce the efficiency of filtration because of compacting the fibers and/or filling of the fibers and the interstices between the fibers, thus diminishing the pores and/or interstices of the disc.

By the property which has been designated as "wash resistance" is meant that property which causes the discs to resist both the impact of falling fluids such as milk, and the flow of milk across and through the disc after impact, the flow sometimes being increased by the various baffle plate elements, to the end that the cotton fibers of the disc will remain in place and no thin spots will develop in the disc with consequent impairment of filtration efficiency.

This property of wash resistance is a physical property which actually may be demonstrated by pouring fluids such as water or milk through a disc held in a strainer, and observing the results which are dependent upon a variety of conditions such as the type of strainer, physical characteristics of the fluid, rate and direction and character of flow, such as height and speed of flow, and the point of impact on the strainer. Prior untreated discs and starch treated discs "wash," that is, the fibers move away from an area of liquid impact or flow and thus create thin spots which usually result in the complete breakdown of the discs. Discs treated in accordance with this invention have by direct comparison in the laboratory and on the farm, been found to possess a high degree of wash resistance and do not deteriorate upon normal usage until long after what is considered to be a single use period, if indeed they are affected at all by further usage.

It has been found that this desired property of wash resistance is different from the inherent properties of an untreated cotton web or from a web to which common sizing treatments have been applied. This property of wash resistance is not closely related to dry or wet tensile strength of the completed web, inasmuch as discs found to possess relatively low wet tensile strength have high wash resistance and vice versa. In order to achieve maximum wet tensile strength there must be a strong bond between many of the fibers all through the web and it appears that these bonds must extend throughout a substantial length of the fibers. Bonding for the purpose of wash resistance on the other hand appears to depend more directly on the bonding between the surface fibers at their points of contact and very little upon the bonding of the interior fibers or bonding throughout a substantial length of the fiber. It is for this reason, surprising as it might otherwise appear, that the minimum of bond, consistent with the required property of wash resistance, results in optimum filtering efficiency.

The type of bonding for wash resistance is also to be distinguished from sizing as that term is understood and used in the textile and paper arts. In the textile art sizing means a material put on the fibers to lay them down to improve mechanical properties during working or to fill the interstices and stiffen the product. For example, starch is an excellent bonding agent for sizing as that term is employed, but is of practically no value as a bonding agent for wash resistance. Sizing materials for textile use must often be capable of ready and complete removal either before the article is sold or used or shortly thereafter. This, of course, is not true of a bonding agent for wash resistance. In the latter instance, the wash resistant bonding agent must remain in the product for an appreciable time and must not fill or unduly stiffen the cotton web, otherwise its filtration efficiency will be impaired.

In paper manufacturing sizing is ordinarily utilized to improve the smoothness or surface of the paper and at other times it is employed to achieve water repellency. In the case of bonding for wash resistance any smoothness obtained on the surface is purely incidental, and no marked difference in water repellency of the bonded cotton fibers is observed.

In other words, the general objective of bonding for wash resistance is to provide a bond between the fibers in and near the surface of the cotton web, which bond will be dissolved or weakened only slowly if at all by contact with water, milk, or other liquids to be filtered and which bond will hold the fibers in essentially their original relative positions during their use as a filter medium and against impact or flow of the liquids being filtered at filtration temperatures. Ordinarily filtration temperatures rarely, if ever, reach above 40° C. on the farm.

The advantages of wash resistant cotton filter discs made in accordance with this invention are particularly noticeable in the case of milk filters. In many strainers using cotton discs as filters, such cotton discs as are now available require single or double facings of gauze to protect them against washing, whereas unfaced wash resistant discs made in accordance with this invention are effective in most of the present types of strainers. The elimination of these gauze reinforcing facings means greater filtration efficiency and a large saving to the milk producer both from the viewpoint of cost of filter discs and of the maintenance of uniform filtration efficiency of the discs, which are unimpaired as to their effectiveness in sediment removal, speed of filtration, and handling qualities.

In accordance with this invention a cotton web is formed of desired thickness or weight by one or more carding machines from which the web is passed through a treatment or application of a solution of a bonding agent, after which the treated web is dried, cut into desired shapes and sizes, counted, and packed. The bonding or application of bonding agent may be accomplished by partial or total immersion, by spraying, licking, painting, or any other suitable application. In drying, the bonding agent, if it has penetrated the web to any appreciable thickness, migrates to the surfaces or the immediate vicinity of the surfaces of the web where it adhesively bonds the fibers at the surface regions of the discs and bonds the fibers at their intersections and points of contiguity in a physical sense to effect wash resistance without seriously affecting filtering efficiency.

It is preferable to use a bonding agent that is either in the first instance or results in bonds which after drying and without further treatment are insoluble or non-dispersible in cold water or milk. If the agents are dispersible in hot water this fact is not detrimental particularly in the milk filtration because milk is not ordinarily filtered while heated. Furthermore, it is desirable to disperse or form a colloidal dispersion of some of the bonding ingredients while hot.

In achieving a wash resistant bond as previously described, many agents and combinations of agents have been found effective. In general, aqueous solutions of the agents or combinations described hereinafter are preferred because of their obvious economy. The substances used should therefore be soluble or dispersible in water and capable of being applied to the cotton web in an economical manner. They should also be convertible either chemically or physically on drying to form a physical bond between the fibers which is resistant to water. Many of the substances named are upon drying converted to a form which is resistant to water, but if this is not the case the inclusion of the added materials indicated does produce the desired water resistance. That is, the treatment or drying of the agents sometimes alone and sometimes in combination with the added materials, appears to insolubilize, in part at least, or otherwise confer the required wash resistance or a desired increase therein. In other words, in some instances wash resistance is conferred whereas in other instances its effectiveness is merely increased by the inclusion of the added materials. It also appears that the inclusion of the added materials affects or shortens the time for "curing" or conferring the wash resistance to the discs. Furthermore, in some instances the bonding agent can be extended by the addition of some less expensive material which also has the property of adding to or conferring the desired wash resistance. Obviously some of the substances impart better "handling" properties than others. The concentrations and conditions given with the agents listed do not prescribe the limits of the various reagents, but merely give these percentages which have been found desirable to impart satisfactory wash resistance to the cotton web when used in present milk filtration. It may be necessary to vary the quantities given in some instances where strainers for industrial filtration apparatus are required, as discs of this character require greater wash resistance than is required in present milk strainers.

When impregnation is used as the method of applying the bond the cotton tends to absorb about three times its weight of the solution. The concentrations referred to are given in terms of the treating solution and are the minimum concentrations of the treating solutions which will result in effective wash resistance at the stated absorption.

The following substances when in aqueous solutions and in the proportions given, (in addition to polyvinyl alcohol, sodium or ammonium alginate, or agar-agar, each used alone, as disclosed in an application Ser. No. 312,624, filed by George A. Cruickshank on January 5, 1940, now issued as Patent No. 2,327,250 dated August 17, 1943), have been found to provide excellent wash resistant surface bonds without resulting in excessive compactness or too stiff "handling" qualities, and having materially increased filtering efficiency.

Carbohydrates and gums:
  Tapioca starch (0.5%)—urea (0.1%)—formaldehyde (0.1%).
  Gum tragacanth (1%).
  Gum tragacanth (0.25%)—formaldehyde (0.25%).
  Gum arabic (0.25%)—potassium dichromate (0.25%).
  Locust bean gum (0.03%)—formaldehyde (0.03%).
  Locust bean gum (0.5%)—borax (0.5%).
  Semolina flour (1.0)%—formaldehyde (1%).
  Gum karaya (0.25%)—formaldehyde (0.25%).
  Ammonium pectate (0.5%)—formaldehyde (0.35%).
  Ammonium alginate (0.025%)—formaldehyde (0.025%).
  Sodium alginate (0.05%)—formaldehyde (0.06%).
Proteins:
  Casein (0.5%)—calcium hydroxide (0.025%).
  Casein (0.25%)—formaldehyde (0.18%).
  Casein (0.5%)—lactic acid (0.25%)—formaldehyde (0.09%).
  Gelatin (0.25%)—formaldehyde (0.036%).
  Gelatin (0.12%)—potassium dichromate (0.12%).
  Gelatin (0.25%)—aluminum sulfate (0.25%).
  Gelatin (0.06%)—ferric chloride (0.06%).
  Egg albumen (0.12%)—formaldehyde (0.05%).
  Egg albumen (0.12%)—potassium dichromate (0.12%).
  Egg albumen (0.25%)—tannic acid (0.06%).
  Egg albumen (0.06%)—ferric chloride (0.06%).
  Blood albumen (0.12%) alone.
  Bone glue #2181 (Armour) (1.0%).
  Bone glue (0.5%)—formaldehyde (0.18%).
  Bone glue (0.5%)—ferric chloride (0.5%).
  Bone glue (0.5%)—potassium dichromate (0.5%).
  Hide glue (Armour #2271) (1.0%).
  Hide glue (0.12%)—formaldehyde (0.045%).
  Hide glue (0.12%)—ferric chloride (0.12%).
  Hide glue (0.25%)—potassium dichromate (0.25%).
  Chrome glue (Armour #2110) (0.12%)—formaldehyde (0.045%).
  Chrome glue (0.06%)—ferric chloride (0.06%).
  Chrome glue (0.25%)—potassium dichromate (0.25%).
  Sodium zeinate (0.5%).
  Sodium zeinate (0.25%)—formaldehyde (0.18%).
Natural resins:
  Shellac (0.5%) cut with ammonia or borax (0.2%).
  Latex, vulcanized (1.0%).
  Dispersite #1458 (a redispersed reclaim rubber mfrd. by Dispersions Process Inc.) (1.0%).
Polyvinyl alcohol:
  Polyvinyl alcohol (0.05%)—ammonium chloride (0.05%).
  Polyvinyl alcohol (0.05%)—ammonium sulphate (0.05%).
  Polyvinyl alcohol (0.05%)—dimethylol urea (0.05%).
  Polyvinyl alcohol (0.017%)—casein (0.017%) (in the presence of ammonium chloride).
Synthetic resins:
  Urea-formaldehyde (1.0%)—ammonium chloride (0.005%).
  Plaskon plywood glue (a urea-formaldehyde resin in powder form mfrd. by Plaskon Co.) (0.25%)—Hardener A (0.005%).
  Emulsion TM 8 (an aqueous dispersion of a fully cured modified synthetic, urea-formaldehyde resin mfrd. by Resinous Products & Chemical Co. Inc.) (0.5%).
  Emulsion TM 7 (same as above) (1.0%).
  Vinyl acetate AYAT (1.0%)—20% solution in toluene emulsified by Aerosol OT.
  Ethyl cellulose (1%)—emulsified toluene solution.
  Polyvinyl acetate (du Pont RH 460A, aqueous dispersion, high viscosity) (1.0%).
  Polyvinyl acetate (0.25%)—formaldehyde (0.09%).
  Polyvinyl acetate (0.5%)—sodium chromate (0.5%).
  Polyvinyl acetate (0.5%)—hydrogen peroxide (5%).
  Polyvinyl acetate (du Pont RH 460, aqueous dispersion, low viscosity) (0.5%)—formaldehyde (0.35%).
  Polyvinyl acetate (0.5%)—sodium chromate (1.0%).
  Hard Nevillac (1%) resin (a phenol modified coumarone-indene resin mfrd. by The Neville Co.) dispersed in water by Aerosol OT.
  Rhotex gum (mfrd. by Rohm & Haas Chemical Co.) (0.5%)—sorbitol tartrate (1.0%).
  Flexalin (diethylene glycol diabietate) (mfrd. by Hercules Powder Co.) (1.0%).
  Styron A-25 (Styrene resin mfrd. by Dow Chemical Co.) (1%)—20% toluene solution emulsified by Aerosol OT.
  Styron A-25 (same as above) (1%)—toluene (2%)—dibutyl phthalate (0.25%).
  Polybutene B-100 (polymerized isobutylene mfrd. by Standard Oil Development Co.) (1.0%)—10% solution in naphtha emulsified by Aerosol OT.
  Bakelite (0.5%)—advanced stage of polymerization of phenol-formaldehyde resin (mfrd. by Bakelite Corporation).
  Marbon (1%)—chlorinated rubber (mfrd. by Marbon Corp.) 20% solution in toluene emulsified by triethanolamine oleate.
  Cyrene #228 (Styrene modified paracoumarone-indene resins mfrd. by The Neville Co.) (1%)—15% solution in toluene emulsified by T. E. A. oleate.
  Rhoplex W-66 (1%)—acrylate resin emulsion (mfrd. by The Resinous Products & Chemical Co.).
  Pliolite (1%) (a modified isomerized rubber mfrd. by Goodyear Rubber Co.) 20% solution in toluene emulsified in T. E. A. oleate.
  Furfuryl resin (acid condensed furfuryl alcohol resin) (0.5%) emulsified with 10% bentonite, based on resin content.
  Melamine resin #621 (melamine—formaldehyde resin mfrd. by American Cyanamid Co. (0.2%).
Inorganic materials:
  Sodium Silicates:
    a. Grade F (Grasselli Chemical Co.) (0.12%).
    b. Grade F (0.12%)—tapioca starch (0.12%).
    c. Grades B, C, K, N, S, V (Philadelphia Quartz Co.) (0.25%).

We claim:

1. Wash resistant filter media, comprising a sheet-like structure of loosely associated fibers, the fibers near and at the surface of the sheet having wash resistance and being physically bonded at their points of contact by a sodium silicate bond having the property of being cold water non-dispersible upon drying and imparting said wash resistance to the surface of said sheet, the interstices between the points of contact of said fibers at and near the surface of said sheet and the interior fibers of said sheet being relatively free of said bond whereby fluids may be filtered through said sheet.

2. Wash resistant filter media, comprising a sheet-like structure of loosely associated fibers, the fibers near and at the surfaces of the sheet having wash resistance, a bond of sodium silicate and tapioca starch for physically bonding the fibers of the sheet at their points of contact near and at the surfaces of the sheet and imparting said wash resistance to the surfaces of said sheet, the interstices between the points of contact of said fibers at and near the surfaces of said sheet and the interior fibers of said sheet being relatively free of said bonding substance whereby fluids may be filtered through said sheet.

HERBERT LEROY DAVIS.
LAURENCE R. B. HERVEY.

REFERENCES CITED

The following references are of record in the file of this patent:

UNITED STATES PATENTS

| Number | Name | Date |
| --- | --- | --- |
| 661,056 | Jolles et al. | Nov. 6, 1900 |
| 1,940,707 | Browne | Dec. 26, 1933 |
| 2,035,406 | Rhodes | Mar. 24, 1936 |
| 2,327,250 | Cruickshank | Aug. 17, 1943 |